March 10, 1964 M. R. BEATTY 3,124,664

LOCK DEVICE FOR TELEPHONES

Filed Feb. 24, 1961

INVENTOR.
MILTON R. BEATTY
BY
Donnelly, Mentag & Harrington
ATTORNEYS 3,124,664
Patented Mar. 10, 1964

3,124,664

LOCK DEVICE FOR TELEPHONES

Milton R. Beatty, Detroit, Mich., assignor to David G. Carty and Steve J. Ternyak, both of Wayne County, Mich.

Filed Feb. 24, 1961, Ser. No. 91,416
1 Claim. (Cl. 179—189)

This invention relates to the telephone art and more particularly, to a telephone provided with a lock device for disabling the telephone, regardless of whether the receiver is lifted from the phone or not.

The present invention is particularly adapted for use with a table type telephone which incorporates a receiver adapted to be disposed on the top of the telephone. In many instances where this type telephone is employed, when the telephone rings, a small child in the area may pick up the telephone receiver without calling an older person and thus hinder or disrupt the incoming call on that telephone. Furthermore, it is common for small children to pick up the receiver of a desk type telephone and play with the telephone receiver whereby incoming calls on that telephone are prohibited from being completed. Accordingly, it is the primary object of the present invention to provide a lock means for use with a desk type telephone which will maintain a telephone in a locked condition to prevent a small child from disrupting incoming calls on a telephone and other like purposes.

It is another object of the present invention to provide a lock device for a desk type telephone which is simple and compact in construction, economical of manufacture, efficient in operation and which may be quickly and easily mounted on a telephone for use therewith.

It is still another object of the present invention to provide a lock means for use on a desk type telephone which is adapted to maintain the switch buttons of a telephone in a depressed condition regardless of whether or not the combination receiver and mouthpiece is lifted from the body of the telephone unless the lock is positively moved from the locking position by a person desiring to answer the telephone or use it for an outgoing call.

Other objects, features and advantages of this invention will be apparent from the following detailed description and appended claims, reference being had to the accompanying drawing forming a part of the specification wherein like reference numerals designate corresponding parts of the several views.

Figure 1:
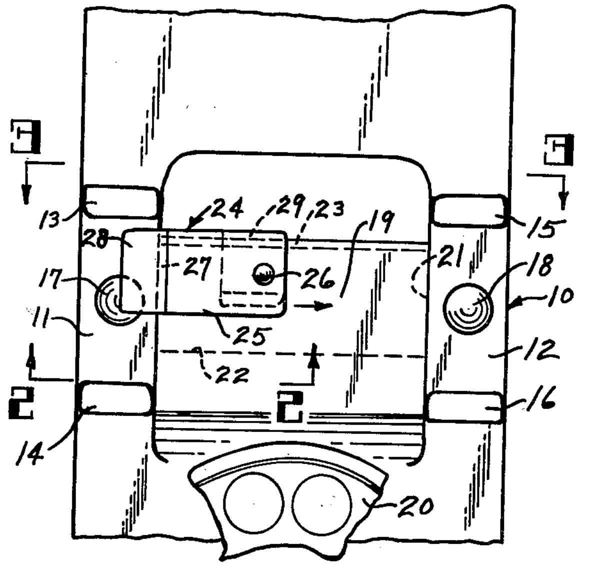
FIG. 1 is a fragmentary top plan view of a conventional type desk telephone and showing this telephone provided with a lock device made in accordance with the principles of this invention.
Figure 2:
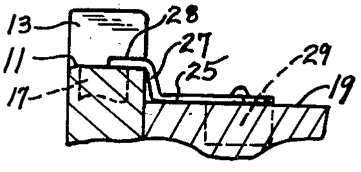
FIG. 2 is a fragmentary elevational sectional view of the structure illustrated in FIG. 1, taken along the line 2—2 thereof and looking in the direction of the arrows.

Referring now to the drawing, and in particular to FIG. 1, the numeral 10 generally designates a conventional type desk telephone which is provided with the usual telephone receiver cradle rest comprising the flat elevated portions 11 and 12. As is shown in FIG. 1, the flat portions 11 and 12 are formed along the sides of the telephone body and are spaced apart from each other and form a platform on which the usual combined receiver and mouthpiece of a telephone are positioned in a horizontal straddling position.

Figure 3:
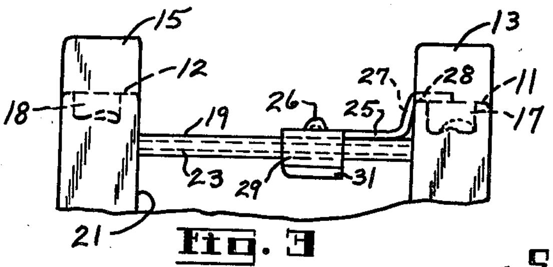
FIG. 3 is a fragmentary elevational sectional view of the structure illustrated in FIG. 1, taken along the line 3—3 thereof and looking in the direction of the arrows.

The conventional desk telephone of FIG. 1 also shows the usual spaced apart posts 13 and 14 on each end of the receiver platform portion 11 and similar like posts 15 and 16 on the ends of the platform portion 12. Centrally mounted in each of the receiver platforms 11 and 12 are the switch or actuator buttons 17 and 18 which are spring biased upwardly to an operative position when the usual combined receiver and mouthpiece is lifted therefrom whereby the telephone may be used to receive incoming calls or to make outgoing calls. The lock device of the present invention which is adapted to maintain the switch buttons 17 and 18 in the downwardly depressed inactive position is generally indicated by the numeral 24. The lock device 24 will be explained more fully hereinafter. As shown in FIGS. 1 and 3, the conventional telephone 10 is provided with a flat portion or platform 19 which is disposed between the receiver platform portions 11 and 12, and at a lower level therefrom. The telephone 10 is provided with the usual finger dial 20. As shown in FIGS. 1 and 3, the conventional telephone 10 is also provided with the usual finger recess 21 which extends inwardly from the rear end of the platform 19 to the point indicated by the numeral 22. The rear end of the platform wall 19 terminates in the downwardly extended lip 23. It will be understood and clearly seen that the finger recess 21 is for use in carrying the telephone from one position to another by inserting fingers of the user into the recess 21 so as to lift up the telephone for transportation purposes.

The telephone lock device 24 of the present invention comprises the horizontal sliding base plate portion 25 which is adapted to be seated on the telephone platform 19 for sliding motion sidewardly in a backward and forward motion as more fully described hereinafter. The lock device 24 further includes the integral raised portion 26 which extends upwardly from the rear end of the slider plate 25 and is adapted for engagement by the finger of a telephone user to provide gripping means between the finger of the user and locking device 24 for moving the same from the locked to the unlocked position, and vice versa. Integrally formed on the front end of the slider plate 25 is the vertically upwardly extended arm portion 27 on the front end which is integrally formed the forwardly extended horizontal sliding lock plate 28.

Figure 4:
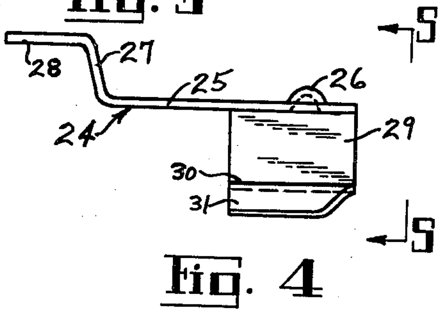
FIG. 4 is a side elevational view of the locking device structure shown in FIG. 5, taken in the direction of the arrow marked "4"
Figure 5:
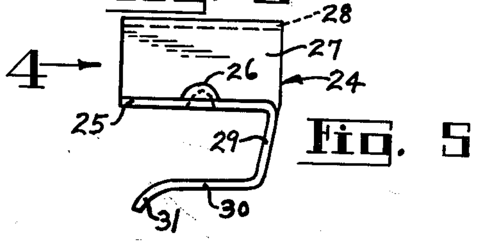
FIG. 5 is an end elevational view of the structure illustrated in FIG. 4, taken along the line 5—5 thereof and looking in the direction of the arrows; and, FIG. 6 is a fragmentary top plan view of the telephone structure of FIG. 1 and showing the locking device of the present invention in an unlocked position.

As best seen in FIGS. 4 and 5, the lock means 24 further includes the integral downwardly extended leg portion 29 which is connected to the rear outer side edge of the sliding plate 25. Integrally connected to the lower end of the leg portion 29 is the inwardly extended clamp plate portion 30 which has the inner end thereof curved downwardly as indicated by the numeral 31. It will be seen that the portions 29, 30 and 31 form a clip portion for retaining the aforedescribed lock portions 25 through 28 on the telephone platform 19.

Figure 6:
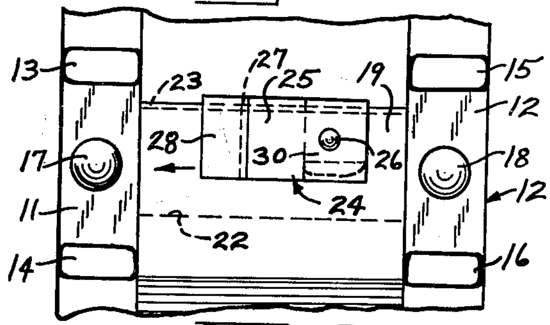

In the use of the telephone lock device of the present invention, the user would merely push the lock means onto the platform 19 with the lock device positioned midway between the receiver platform portions 11 and 12. It will be seen from FIG. 5 that the portions 25, 29, and 30 function as a C-shaped clamp means for clamping the lock device onto the telephone platform 19. The lock device 24 may then be moved to the left as viewed in FIG. 1 whereby the horizontal sliding lock plate 28 will maintain the actuator button 17 in the depressed inactive position. It will be understood of course that the actuator switch button 17 will have to be first manually pressed by the operator before the locking plate 28 can be moved thereover. The telephone receiver may then be positioned on the platform portions 11 and 12 since the plate portion 28 is very thin and will not disturb the normal disposition of the receiver on the platform portions 11 and 12. When the lock device is in the position shown in FIG. 1, the person may pick up the receiver and the telephone will not be operative. As for example, if a small child picks up the receiver and plays with the telephone dial, such action will not prevent an incoming call from actuating the bell to indicate to a nearby adult that a call is coming in. Normally, if a child will pick up the receiver and play with the telephone, such action would prevent an incoming call from being completed since the telephone would indicate a busy tone. The user of the telephone in order to take an incoming call or to place an outgoing call when the lock is in the position as shown in FIG. 1, would merely have to place his thumb or some other finger on the projection 26 and exert a force to the right to slide the lock to the position shown in FIG. 6 whereby the phone is in an operative condition. Experience has shown that the locking device of the present invention is a very practical and efficient device for the purposes intended and explained hereinabove.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. As for example, the lock device of the present invention could be used for advertising purposes by imprinting the name of a business firm on the top surface therefor, or by putting labels thereon or impressing a plate thereon carrying advertising matter.

What I claim is:

The combination of, a telephone having a cradle for the reception of a combination receiver and mouthpiece, said cradle including a pair of spaced apart flat elevated portions which are interconnected by a flat platform, a switch button movably mounted in each of the flat elevated portions, each of said switch buttons being normally spring biased upwardly to an operative position above the flat elevated portions when the combination receiver and mouthpiece is removed from the cradle and being pressed downwardly to an inoperative position when the combination receiver and mouthpiece is placed in the cradle, and, a lock means comprising a C-shaped clamp member slidably mounted on the flat platform between said flat elevated portions, a slider plate integrally connected to the C-shaped clamp member and extended outwardly sidewardly toward one of the flat elevated portions, a vertically upwardly extended arm portion integrally connected to the outer end of the slider plate, and, an integral horizontally extended sliding lock plate formed on the outer end of said arm portion and adapted to slidably engage the surface of one of said flat elevated portions to hold the switch button in said flat elevated portion in an inoperative position, and adapted to release said switch button when the C-shaped clamp member is moved away from the last mentioned flat elevated portion.

References Cited in the file of this patent

UNITED STATES PATENTS

| | | |
|---|---|---|
| 2,518,554 | Kirby | Aug. 15, 1950 |
| 2,558,661 | Murray | June 26, 1951 |
| 2,683,778 | Gilmore et al. | July 13, 1954 |
| 2,731,522 | Anklesaria | Jan. 17, 1956 |